United States Patent [19]
Shetty

[11] 3,846,427
[45] Nov. 5, 1974

[54] 1-(PHTHALIMIDO-ALKYL)-1,2,3,4-TETRAHYDROQUINAZOLINONES AND ANALOGUES THEREOF

[75] Inventor: Bola Vithal Shetty, Bombay, India

[73] Assignee: Pennwalt Corporation, Philadelphia, Pa.

[22] Filed: Nov. 16, 1971

[21] Appl. No.: 199,366

Related U.S. Application Data

[60] Continuation-in-part of Ser. No. 108,619, Jan. 21, 1971, abandoned, which is a division of Ser. No. 691,955, Dec. 20, 1967, Pat. No. 3,635,976.

[52] U.S. Cl. .......................................... 260/256.4 Q
[51] Int. Cl. .......................................... C07d 51/48
[58] Field of Search .............................. 260/256.4 Q

[56] References Cited
UNITED STATES PATENTS
3,048,587  8/1962  Oroshnik .................. 260/256.4

Primary Examiner—Raymond V. Rush
Attorney, Agent, or Firm—Charles E. Feeny

[57] ABSTRACT

Analgesic 1-(2-phthalimido-alkyl)-1,2,3,4-tetrahydro-4-quinazolinones, 2-(2-phthalimido-alkylamino) benzamides and precursors therefor. Methods are disclosed for the preparation of the named compounds. Data regarding symptomatology, analgesic activity, local anesthesia and narcotic antagonism are given. Representative compounds are 2-(2-phthalimido-ethylamino) benzamide and 2-phenyl-1-(2-phthalimido-ethyl)-1,2,3,4-tetrahydro-4-quinazolinone.

1 Claim, No Drawings

1-(PHTHALIMIDO-ALKYL)-1,2,3,4-TETRAHYDROQUINAZOLINONES AND ANALOGUES THEREOF

CROSS REFERENCES

This application is a continuation-in-part of application Ser. No. 108,619 filed Jan. 21, 1971, now abandoned, which in turn is a division of application Ser. No. 691,955 filed Dec. 20, 1967, now U.S. Pat. No. 3,635,976.

This invention relates to 1-(phthalimido-alkyl)-1,2,3,4-tetrahydroquinazolinones, intermediate compounds therefor, and acid addition salts thereof. Both the quinazolinones and the corresponding benzamide intermediates therefor are characterized by having analgesic properties. More particularly the invention relates to compounds of the formulae:

cycloaliphatic or heterocyclic ring preferably having 3 to 10 carbon atoms, either of which rings may be unsubstituted or substituted, e.g. $NH_2$, OH, $OCH_3$, $CH_3$, Cl;

$R^4$ is H, lower alkyl, phenyl, aryl substituted by OH, $NH_2$, $OCH_3$, $CH_3$ or CL;

$R^5$ is H, loweralkyl, heterocyclic, aryl, aralkyl, substituted aralkyl (e.g. $NH_2$, OH, $OCH_3$, $CH_3$, Cl), substituted aryl (e.g. OH, $OCH_3$, $NH_2$, $CH_3$, Cl) or

$R^6$ is OH, loweralkoxy, (e.g. $OCH_3$, $CCH_2$-$CH_3$), heterocyclic (e.g.

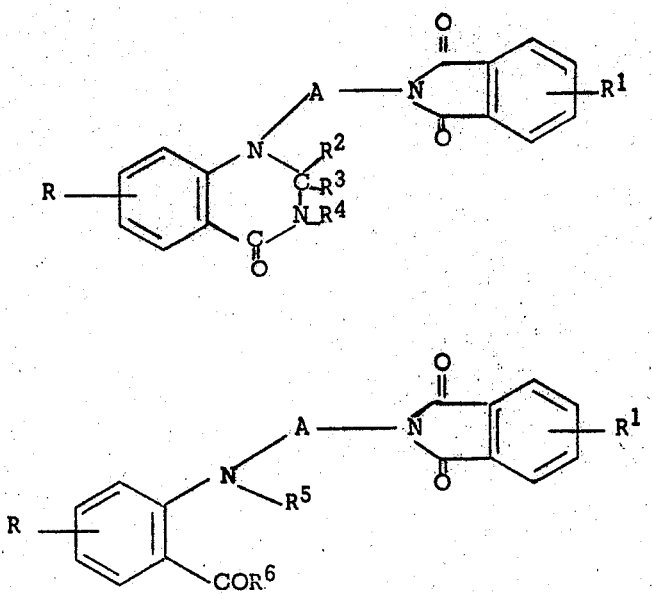

wherein

R is H, loweralkyl, hydroxy, loweralkoxy, halogen, amino, or substituted amino (e.g. $NHCOCH_3$, —NHCHO);

A is $(CH_2)_n$ where $n$ is 1–5, or a branched alkyl with 3 to 5 carbon atoms;

$R^1$ is H, OH, loweralkoxy, halogen or loweralkyl;

$R^2$ and $R^3$ each is H, lower alkyl, heterocyclic, aryl, aryl substituted by $NH_2$, OH, $OCH_3$, $CH_3$ or Cl, aralkyl or aralkyl substituted by OH, $NH_2$, $OCH_3$, $CH_3$ or Cl;

$R^2$ and $R^3$ can be joined together to form with the two position carbon atom to which they are attached a $NH_2$, —NH—loweralkyl, or —N—(disubstituted with loweralkyl), phenylamino, arylamino substituted in the aryl radical by OH, $NH_2$, $OCH_3$, $CH_3$ or Cl or aralkylamino substituted in the aralkyl radical by OH, $NH_2$, $OCH_3$, $CH_3$ or Cl; and pharmacologically acceptable acid addition salts of the above compounds.

The compounds of the present invention may be prepared by various methods which are known in principle. Two convenient methods are illustrated in the following diagram of a general synthetic route, the schematic and short hand representations of which are those known in the art and wherein R' is H or lower alkyl; R' $CH_2CH_2$ is A, and R'' is $R^2$ and/or $R^3$.

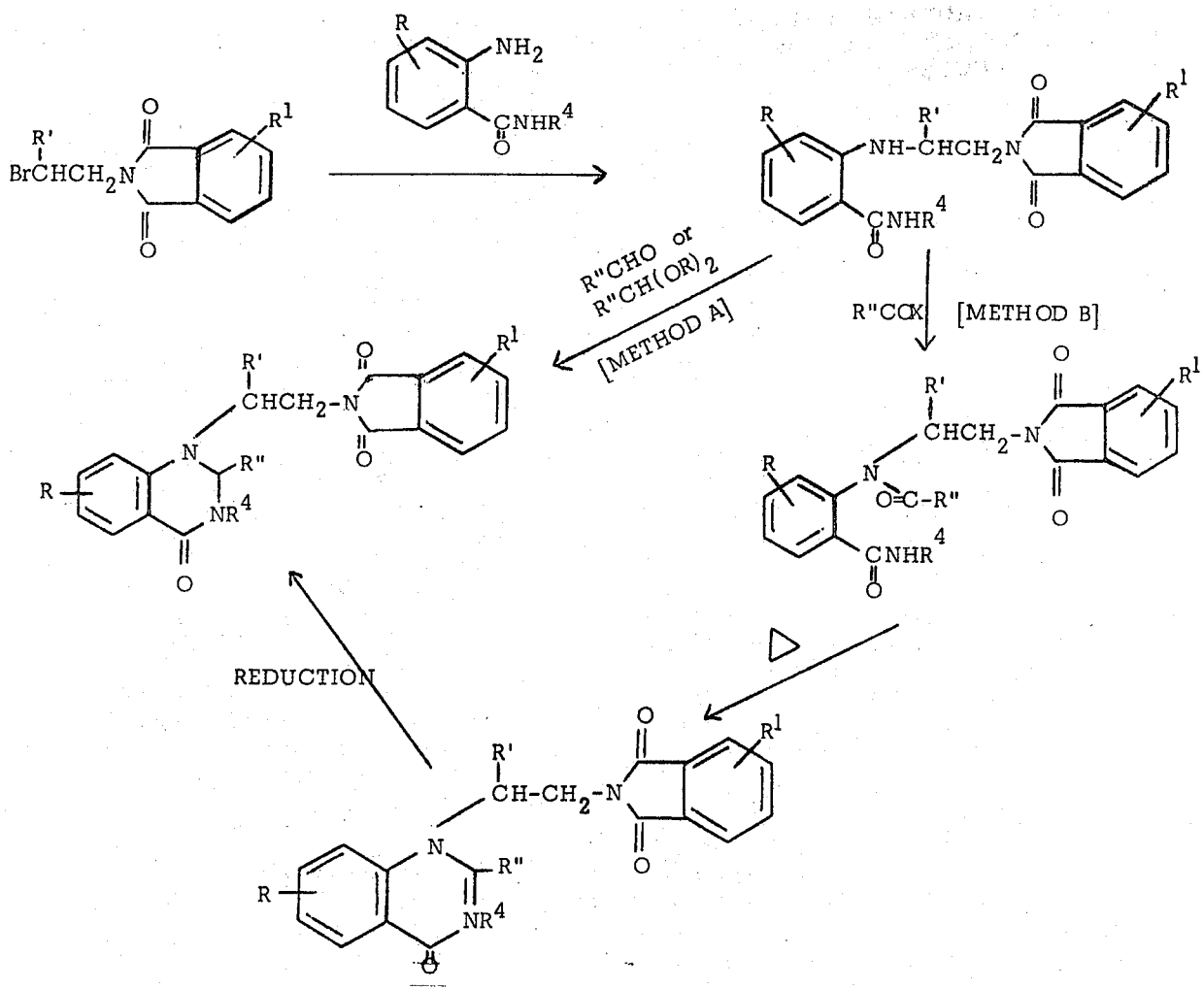

2-Methyl-1-(2-phthalimido-ethyl)-1,2,3,4-tetrahydro-4-quinazolinone;
2-Phenyl-1-(2-phthalimido-ethyl)-1,2,3,4-tetrahydro-4-quinazolinone;
2-Benzyl-1-(2-phthalimido-ethyl)-1,2,3,4-tetrahydro-4-quinazolinone;
6-Amino-2-phenyl-1-(2-phthalimido-ethyl)-1,2,3,4-tetrahydro-4-quinazolinone;
7-Amino-2-phenyl-1-(2-phthalimido-ethyl)-1,2,3,4-tetrahydro-4-quinazolinone;
1-(2-[3-Hydroxyphthalimido]ethyl)-2-phenyl-1,2,3,4-tetrahydro-4-quinazolinone;
1-(2-[3-Methoxyphthalimido]ethyl)-2-phenyl-1,2,3,4-tetrahydro-4-quinazolinone;
1'-[2-Phthalimido-ethyl]-spiro-[cyclopentane-1,2'(1'H)-quinazolin]-4'(3'H)-one;
1-(2-Phthalimido-ethyl)-1,2,3,4-tetrahydro-4-quinazolinone;
2-(p-Aminophenyl)-1-(2-phthalimido-ethyl)-1,2,3,4-tetrahydro-4-quinazolinone;
6-Hydroxy-2-phenyl-1-(2-Phthalimido-ethyl)-1,2,3,4-tetrahydro-4-quinazolinone;
6-Methoxy-2-phenyl-1-(2-phthalimido-ethyl)-1,2,3,4-tetrahydro-4-quinazolinone;
1-Methyl-1'-(2-phthalimido-ethyl)-spiro-[piperidine-4,2'(1'H-quinazolin]-4'(3'H)-one;
2-(2-Phthalimido-ethylamino) benzamide;
5-Amino-2-(2-phthalimido-ethylamino) benzamide;
4-Amino-2-(2-phthalimido-ethylamino) benzamide;
2-(2-[3-Hydroxyphthalimido] ethylamino) benzamide;
2-(2-[3-Methoxyphthalimido] ethylamino) benzamide;
2'-(2-Phthalimido-ethylamino)-4-benzoylmorpholine;
2'-(2-Phthalimido-ethylamino)-1-benzoylpiperidine;
5-Hydroxy-2-(2-phthalimido-ethylamino) benzamide, and
5-Methoxy-2-(2-phthalimido-ethylamino) benzamide.

If desired the above described compounds may be transformed into their acid addition salts, or quaternary ammonium salts by customary methods. For instance the acid addition salts may be obtained by dissolving the free base in a suitable solvent and acidifying the solution with the desired acid. Suitable pharmacologically effective acid addition salts include the sulfates, hydrochlorides, phosphates, cyclohexyl sulfamates, maleates, citrates, tartrates, succinates, ethane disulfonates, methane sulfonate, isethionates, and the resinates obtained by reacting the amine group of the compound with a cation exchange resin such as a sulfonic, carboxylic, or phosphoric acid cation exchange resin.

To prepare a quaternary ammonium salt the free base is merely reacted with a suitable quaternerizing agent, such as an alkyl halide, an aralkyl halide or dialkyl sulfate, preferably in the presence of an inert organic acid.

The following working examples further illustrate this invention.

EXAMPLE 1

Preparation of 2-(2-phthalimide-ethylamino) benzamide (760–37)

2-Aminobenzamide (13.6 g), 33 g N-(2-bromoethyl) phthalimido, 17.5 g sodium acetate, and 60 ml water were refluxed 20 hrs. The mixture was cooled, diluted with 60 ml water and 60 ml conc $NH_4OH$. The solid was filtered, washed with 100 ml 1:1 $NH_4OH$-water, then with water, isopropanol, ether and air dried to give 20 g product. An 8 g portion was recrystallized from 60 ml methoxyethanol to give 7.0 g, m. 224°–6°C.

|  | C | H | N |
|---|---|---|---|
| Calcd. | 66.01 | 4.89 | 13.59 |
| Found | 65.82 | 5.02 | 13.46 |

EXAMPLE 2

Preparation of 2-phenyl-1-(2-phenyl-1-(2-phthalimido-ethyl)1,2,3,4-tetrahydro-4-quinazolinone (760–42)

2-(2-Phthalimido-ethylamino) benzamide (24.8 g) in 240 ml acetic acid was treated with 12 g benzaldehyde and 4 ml sulfuric acid. After 24 hours, the mixture was poured into 2,400 ml ice water and filtered. The solid was washed with water, stirred with 240 ml ethyl acetate and filtered to give 22.3 g product, m. 182°–4°. Recrystallization of 22 g from 75 ml methoxyethanol gave 16.9 g, m. 184°–6°C.

|  | C | H | N |
|---|---|---|---|
| Calcd | 72.53 | 4.82 | 10.57 |
| Found | 72.50 | 5.16 | 10.47 |

PHARMACOLOGICAL ACTIVITY OF COMPOUNDS OF THIS INVENTION

The compounds of this invention are useful pharmacologically as set forth below. In addition both the benzamides and the quinazolinones of this invention may be converted by reduction to the corresponding isoindolinyl alkyl benzamides and quinazolinones.

The compounds of this invention, when administered to mice by various routes, have been found to possess effective analgesic activity. These compounds are characterized further by a very low order of toxicity in experimental animals and appear to be substantially non-addicting. Different lots of the compounds prepared as disclosed have not been found to display significant differences.

A 2 percent suspension of soluble starch (Clearjel) in distilled water was employed as the vehicle for all tests set forth in Table I for compound 760–037 while solutions of compound 760–042 in distilled water were used for all of the tests set forth in Table I.

ANALGESIC ACTIVITY

The writhing test described by Sigmund et al., Proc. Soc. Exp. Biol. and Med. 95:729 (1957) has been applied in both rats and mice as an indication of analgesic activity. This method has been reported to be of value in detecting activity of narcotic antagonist analgesics which sometimes do not exhibit activity with use of other conventional methods. The stimulus of intraperitoneal injection of phenylbenzoquinone results in a writhing syndrone characterized by periodic twisting and stretching of the body with extension of the hind legs. Frequency of writhing has been shown to be reduced or prevented by prior administration of narcotic and non-narcotic analgesics. A test compound is considered to have analgesic properties if, by prior administration, it is able to reduce significantly the number of writhes from that obtained by a group receiving vehicle along. The dose of compound protecting 50 percent of the animals is determined and expressed as the $ED_{50}$. Ten animals are used at each dose level.

Both compounds 760-037 and 760-042 show by their HNSD that they are effective pharmacological agents of medium to relatively high potency. In addition, both compounds have a very low order of toxicity. Finally compound 760-042 is indicated to be an effective analgesic by the PBQ oral test.

NARCOTIC ANTAGONISM

Certain compounds have the ability to antagonize the activity of strong narcotic analgesics in animals, whereas when tested by conventional methods in mice and rats little or no analgesia can be demonstrated. Some of these compounds have been shown to be very effective analgesics in man. The compounds of this invention were tested for their ability to antagonize narcotic analgesics using oxymorphone, a morphine derivative, which when administered to mice, causes pupil dilation. It has been demonstrated in our laboratory that narcotic antagonists are able to reduce this mydriatic response significantly if administered prior to oxymorphone administration, whereas narcotic agents such as morphine and codeine cause no change or cause an increase in the pupil size.

TABLE 1

| Compound | I.P.[4] HNSD[1] mg/kg | I.P. $LD_{50}$[2] mg/kg | P.O.[5] PBQ[3] $ED_{50}$ mg/kg | S.C.[6] PBQ $ED_{50}$[2] mg/kg | Narcotic Antagonism |
|---|---|---|---|---|---|
| 760-037 | 100 | 300 | 100 | 100 | Neg. |
| 760-042 | 30 | 300 | 30 | 100 | Neg. |

[1]HNSD = Highest non-symptomatic dose. That dose which is the highest that can be administered without appearance of gross effects.
[2]$LD_{50}$ = median Lethal Dose    $ED_{50}$ = Median Effective Dose
[3]PBQ = Phenylbenzoquinone writhing test for analgesia
[4]I.P. = Intraperitoneal
[5]P.O. = Oral
[6]S.C. = Subcutaneous

The invention claimed is:
1. 2-phenyl-1-(2-phthalimido-ethyl)-1,2,3,4-tetrahydro-4-quinazolin-one.

* * * * *